(12) United States Patent
Horikawa (10) Patent No.: US 9,794,485 B2
(45) Date of Patent: Oct. 17, 2017

(54) IMAGE PROCESSING APPARATUS AND METHOD, AND IMAGE CAPTURING APPARATUS

(71) Applicant: CANON KABUSHIKI KAISHA, Tokyo (JP)

(72) Inventor: Yohei Horikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 15/059,617

(22) Filed: Mar. 3, 2016

(65) Prior Publication Data
US 2016/0261799 A1 Sep. 8, 2016

(30) Foreign Application Priority Data
Mar. 4, 2015 (JP) .................................. 2015-042976

(51) Int. Cl.
*H04N 5/232* (2006.01)
(52) U.S. Cl.
CPC ......... *H04N 5/23267* (2013.01); *H04N 5/232* (2013.01); *H04N 5/23212* (2013.01); *H04N 5/23287* (2013.01)
(58) Field of Classification Search
CPC ............... H04N 5/232; H04N 5/23212; H04N 5/23267; H04N 5/23287
See application file for complete search history.

(56) References Cited

U.S. PATENT DOCUMENTS

| | | | |
|---|---|---|---|
| 8,358,367 B2 | 1/2013 | Ng et al. | |
| 2010/0165134 A1* | 7/2010 | Dowski, Jr. | B24B 13/06 348/218.1 |
| 2013/0182082 A1* | 7/2013 | Hayashi | H04N 5/23258 348/49 |
| 2014/0300792 A1* | 10/2014 | Nakamura | H04N 5/23212 348/333.08 |
| 2015/0022712 A1* | 1/2015 | Koishi | G02B 7/28 348/352 |
| 2015/0092098 A1* | 4/2015 | Konishi | H04N 5/2352 348/333.11 |
| 2015/0097991 A1* | 4/2015 | Nobayashi | H04N 5/23212 348/241 |

FOREIGN PATENT DOCUMENTS

| | | |
|---|---|---|
| JP | 3003370 B | 1/2000 |
| JP | 2008-134329 A | 6/2008 |
| JP | 2009-258389 A | 11/2009 |

* cited by examiner

*Primary Examiner* — Amy Hsu
(74) *Attorney, Agent, or Firm* — Cowan, Liebowitz & Latman, P.C.

(57) ABSTRACT

An image processing apparatus that corrects an image using an image signal obtained by performing shooting by an image sensor which includes a plurality of photoelectric conversion portions that correspond to each of a plurality of microlenses and performs photoelectric conversion on a light flux that enters via an imaging optical system including an image stabilization optical system configured to correct a camera shake, comprising: a first obtaining unit that obtains the image signal and a driving state of the image stabilization optical system at a time of image shooting; a second obtaining unit that obtains correction values for correcting variation in defocus amounts occurred due to driving of the image stabilization optical system; and a refocus unit that corrects the variation in defocus amounts by refocusing on the basis of the correction values.

13 Claims, 9 Drawing Sheets

IMAGE PROCESSING APPARATUS AND METHOD, AND IMAGE CAPTURING APPARATUS

BACKGROUND OF THE INVENTION

Field of the Invention

The present invention relates to an image processing apparatus, image processing method, and an image capturing apparatus, and in particular relates to an image capturing apparatus having a camera shake correction function and a refocus function, and an image processing apparatus and image processing method that processes an image signal obtained from the image capturing apparatus.

Description of the Related Art

Conventionally, a digital camera having a camera shake correction function has been proposed. With a digital camera having a camera shake correction function, the camera shake correction function is realized by changing the attitude of an optical member and/or an image sensor in a desired direction according to a detected camera shake amount. With the method of changing the attitude of an optical member, it is possible to widen the angle in which correction is possible by changing multiple optical members in respective independent directions.

Japanese Patent Laid-Open No. 2009-258389 discloses a method in which a frontward first movable lens barrel that supports a first optical member and a rearward second movable lens barrel that supports a second optical member are arranged with a fixing member interposed therebetween, and thereby the movable lens barrels are driven independently of each other so as to correct camera shake. Also, Japanese Patent No. 3003370 and Japanese Patent Laid-Open No. 2008-134329 disclose a method of correcting camera shake by driving an optical member such that an arc is traced with a point on an optical axis serving as the center of rotation.

Further, Japanese Patent Laid-Open No. 2008-134329 discloses a method of realizing the driving of an optical member such that an arc is traced with a point on an optical axis serving as the center of rotation by arranging a plurality of spheres between a holding frame of a convex spherical lens and a holding member of a concave spherical lens, and moving the convex spherical lens.

On the other hand, by arranging a microlens array with a ratio of one microlens for a plurality of pixels on a front surface of an image sensor, it is possible to acquire not only a two-dimensional intensity distribution of light, but also information on the entrance direction of light rays that enter the image sensor, and to obtain three-dimensional information on the subject space. A camera capable of obtaining this kind of three-dimensional information on the subject space is called a light-field camera. Moreover, the three-dimensional information on the subject space is called light-field data, and by acquiring the light-field data and performing image reconstruction after shooting, it is possible to perform image processing known as refocusing, such as changing the focus position of the image, changing the shooting viewpoint, and adjusting the depth of field.

With this kind of light-field camera, a plenoptic method is widely known. With the plenoptic method, divided photoelectric conversion elements (PD) for image capture are arranged two-dimensionally below microlenses in a microlens array, and focus lenses included in an optical system serve as exit pupils for the microlenses. In an image capturing apparatus with this kind of configuration, it is known that signals obtained from multiple PDs existing below the microlenses include multiple pieces of light ray information from the subject. Multiple two-dimensional images, which are each formed using, among the signals obtained from the group of PDs located below the microlenses, only signals obtained from PDs that exist at the same location with respect to each microlens using the light ray information, have parallax with respect to each other, unlike normal two-dimensional images. By compositing the two-dimensional images with such parallax, it is possible to virtually move the focus plane of the image (see U.S. Pat. No. 8,358,367).

However, even if an image stabilization optical system is driven in methods as disclosed in the Japanese Patent No. 3003370 and Japanese Patent Laid-Open No. 2008-134329, it is difficult to keep an image plane and an image pickup surface in parallel in every state of the image stabilization optical system.

Further, in the image stabilization optical system described in Japanese Patent Laid-Open No. 2008-134329, since an optical member is designed so as to optimally keep an image plane and an image pickup surface in parallel at a given focal length, it is difficult to keep the image plane and the image pickup surface in parallel depending on the focal length of a zoom lens.

As described above, when an image stabilization optical system is used, there may be a case where uneven blurring occurs in a shot image because an image plane and an image pickup surface cannot be kept in parallel. Especially, if uneven blurring occurs in each frame while shooting a moving image, a problem occurs in that the quality of the shot moving image is significantly reduced.

SUMMARY OF THE INVENTION

The present invention has been made in consideration of the above situation, and obtains a high-quality moving image even in a state in which uneven blurring occurs due to driving of an image stabilization optical system.

According to the present invention, provided is an image processing apparatus that corrects an image using an image signal obtained by performing shooting by an image sensor which includes a plurality of photoelectric conversion portions that correspond to each of a plurality of microlenses and is configured to perform photoelectric conversion on a light flux that enters via an imaging optical system including an image stabilization optical system configured to correct a camera shake, comprising: a first obtaining unit that obtains the image signal and a driving state of the image stabilization optical system at a time of image shooting; a second obtaining unit that obtains correction values for correcting variation in defocus amounts due to shift of a focus plane at different image heights in the image sensor that occurred due to driving of the image stabilization optical system; and a refocus unit that performs refocusing on the basis of the obtained image signal and generates the image, wherein the refocus unit corrects the variation in defocus amounts by refocusing on the basis of the correction values.

Further, according to the present invention, provided is an image capturing apparatus comprising: an image sensor; and an image processing apparatus that corrects an image using an image signal obtained by performing shooting by an image sensor which includes a plurality of photoelectric conversion portions that correspond to each of a plurality of microlenses and is configured to perform photoelectric conversion on a light flux that enters via an imaging optical system including an image stabilization optical system configured to correct a camera shake, wherein the image processing apparatus comprising: a first obtaining unit that obtains the image signal and a driving state of the image stabilization optical system at a time of image shooting; a second obtaining unit that obtains correction values for correcting variation in defocus amounts due to shift of a focus plane at different image heights in the image sensor that occurred due to driving of the image stabilization optical system; and a refocus unit that performs refocusing on the basis of the obtained image signal and generates the image, wherein the refocus unit corrects the variation in defocus amounts by refocusing on the basis of the correction values.

Furthermore, according to the present invention, provided is an image processing method of correcting an image using an image signal obtained by performing shooting by an image sensor which includes a plurality of photoelectric conversion portions that correspond to each of a plurality of microlenses and is configured to perform photoelectric conversion on a light flux that enters via an imaging optical system including an image stabilization optical system configured to correct a camera shake, the method comprising: obtaining the image signal and a driving state of the image stabilization optical system at a time of image shooting; obtaining correction values for correcting variation in defocus amounts due to shift of a focus plane at different image heights in the image sensor that occurred due to driving of the image stabilization optical system; and performing refocusing on the basis of the obtained image signal and generates the image, wherein the variation in defocus amounts is corrected by the refocusing on the basis of the correction values.

Further, according to the present invention, provided is a non-transitory readable storage medium having stored thereon a program which is executable by a computer, the program having a program code for causing the computer to function as each unit of an image processing apparatus that corrects an image using an image signal obtained by performing shooting by an image sensor which includes a plurality of photoelectric conversion portions that correspond to each of a plurality of microlenses and is configured to perform photoelectric conversion on a light flux that enters via an imaging optical system including an image stabilization optical system configured to correct a camera shake, the apparatus comprising: a first obtaining unit that obtains the image signal and a driving state of the image stabilization optical system at a time of image shooting; a second obtaining unit that obtains correction values for correcting variation in defocus amounts due to shift of a focus plane at different image heights in the image sensor that occurred due to driving of the image stabilization optical system; and a refocus unit that performs refocusing on the basis of the obtained image signal and generates the image, wherein the refocus unit corrects the variation in defocus amounts by refocusing on the basis of the correction values.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1:
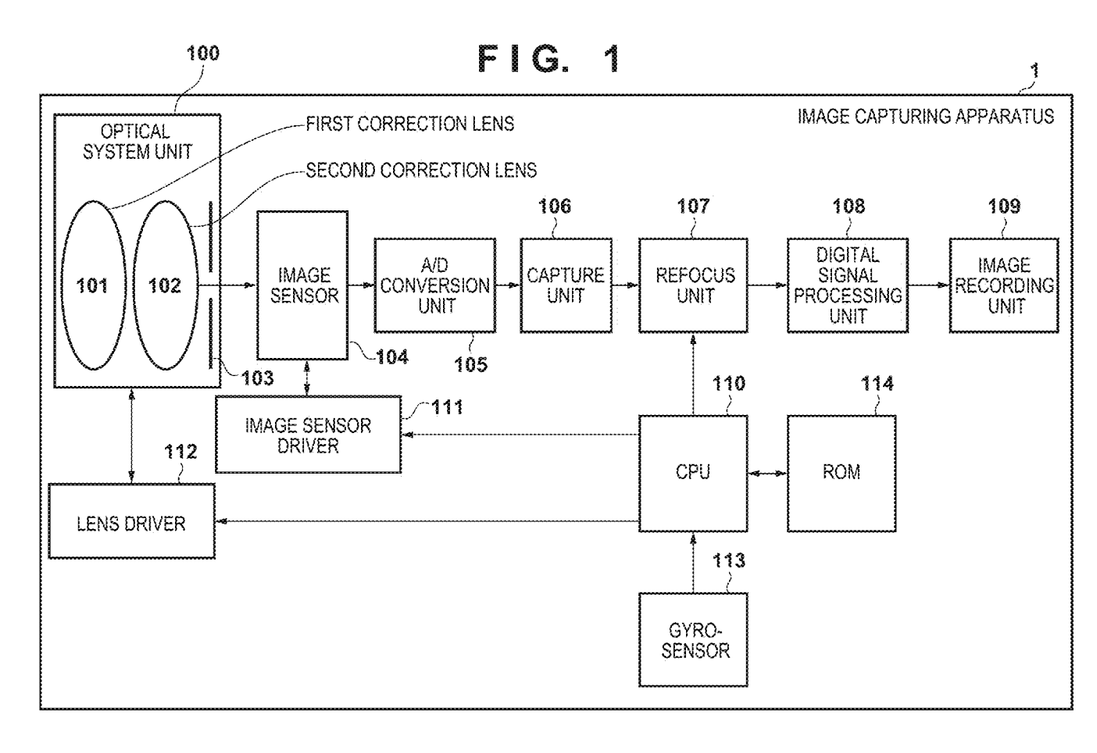
FIG. 1 is a block diagram showing an overall configuration of an image capturing apparatus according to the present invention.

FIG. 1 is a block diagram showing a configuration of an image capturing apparatus 1 according to a first embodiment of the present invention. In FIG. 1, an optical system unit 100 includes at least an image stabilization optical system composed of a first correction lens 101 and a second correction lens 102, and a diaphragm 103. Furthermore, the optical system unit 100 has a zoom lens and a focus lens (not shown), which are driven based on output from a lens driver 112, and configures an image capture optical system together with the first correction lens 101, the second correction lens 102, and the diaphragm 103.

In this first embodiment, the first correction lens 101 is tilted with respect to a vertical plane so that an arc is traced with a point on an optical axis serving as the center, and thus it is possible to refract a light flux that has entered. On the other hand, the second correction lens 102 can translate the light flux that has entered by moving (shifting) in a direction orthogonal to the optical axis.

A gyrosensor 113 detects acceleration in three directions of the image capturing apparatus 1 and outputs it to a CPU 110. The lens driver 112 performs image stabilization driving of the optical system unit 100 in accordance with the output from the CPU 110, and performs control of the tilt angle of the first correction lens 101 and control of the vertical movement amount of the second correction lens 102. Note that the specific control of the tilt angle will be described in detail later.

Moreover, the CPU 110 controls the exposure amount by controlling the diaphragm 103 and a shutter (not shown) that are included in the optical system unit 100 via the lens driver 112. A light flux that enters via the optical system unit 100 is formed on a light reception surface of the image sensor 104 and is subjected to photoelectric conversion. The image sensor 104 is such that pixel unit cells that each includes one microlens and multiple photodiodes (PDs), which are photoelectric conversion portions, are aligned in the form of a two-dimensional matrix. Charges accumulated in the PDs are read out with addition or non-addition in accordance with the output from an image sensor driver 111, and are output to an A/D conversion unit 105. The image sensor driver 111 is controlled by the CPU 110, and sets the ISO sensitivity and the like, in addition to switching between addition and non-addition readout of the image sensor 104.

Figure 2A:
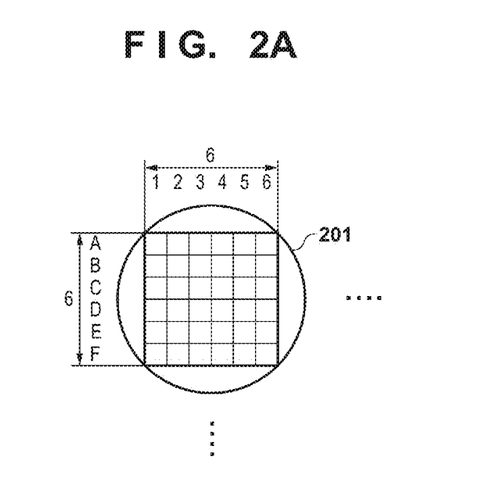
FIGS. 2A to 2C are diagrams showing a configuration of pixel unit cells of an image sensor used in a first embodiment, and examples of obtained images.
Figure 2B:
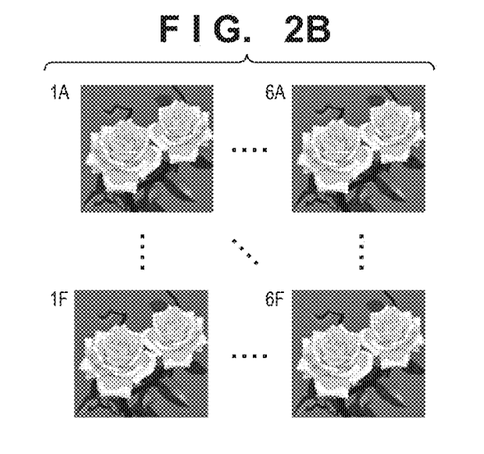
Figure 2C:
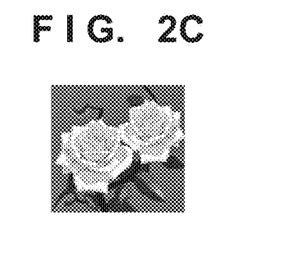

Here, a pixel unit cell arranged in the image sensor 104 in the first embodiment will be described with reference to FIGS. 2A to 2C. As shown in FIG. 2A, a pixel unit cell includes 6×6 PDs 1A to 6F with respect to one microlens 201 included in the microlens array. These kinds of pixel unit cells are arranged two-dimensionally in a Bayer arrangement on the image sensor 104.

After an analog signal processing unit (not shown) performs analog signal processing on analog electrical signals output from the image sensor 104, the A/D conversion unit 105 converts the analog electrical signals into digital electrical signals (pixel signals), which are then output to a capture unit 106. Note that the analog signal processing unit is a CDS circuit, a non-linear amplifier circuit, or the like that removes noise on a transmission path, for example.

The capture unit 106 determines the validity period and type of the pixel signal and outputs signals read out from the PDs 1A to 6F, or signals obtained by performing addition readout from the PDs 1A to 6F to a refocus unit 107 as light field (LF) data.

The refocus unit 107 performs refocus processing in accordance with the PD division number set by the CPU 110 and corrects blurring that appears due to the driving of the first correction lens 101 and the second correction lens 102.

In a digital signal processing unit 108, image signals that are input in a Bayer arrangement are subjected to digital signal processing, known representative examples of which include synchronization processing, gamma processing, and noise reduction processing. The output from the digital signal processing unit 108 is recorded in an image recording unit 109 constituted by a memory card such as an SD card, or the like, and is output to an image display unit (not shown).

The CPU 110 is a central processing unit that performs overall system control of the image capturing apparatus 1, and performs operations based on a program recorded in a ROM 114. In this first embodiment, the CPU 110 calculates and sets parameters for image stabilization and image correction with respect to the refocus unit 107, the image sensor driver 111, and the lens driver 112.

The ROM 114 stores micro codes that are program information for the CPU 110 to perform the overall system control of the image capturing apparatus 1. The ROM 114 also stores refocus parameters with respect to different image heights based on position information of the image stabilization optical system, and conversion coefficients K for converting image shift amounts to defocus amounts. It should be noted that the refocus parameters and the conversion coefficient K will be described later in detail.

Next, a control method for the first correction lens 101 and the second correction lens 102 in image stabilization control will be described with reference to FIGS. 3A to 3C.

Figure 3A:
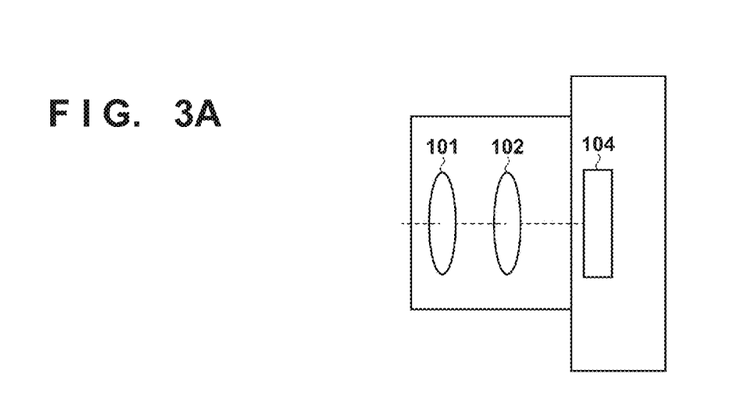
FIGS. 3A to 3C are diagrams showing a positional relationship between a first correction lens, a second correction lens, and an image sensor.
Figure 3B:
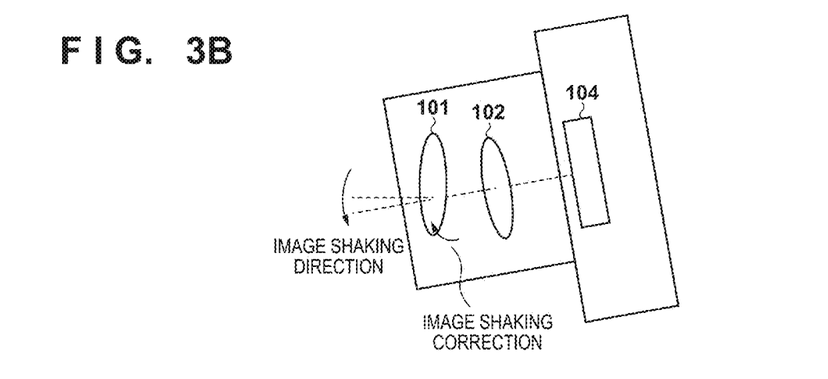
Figure 3C:
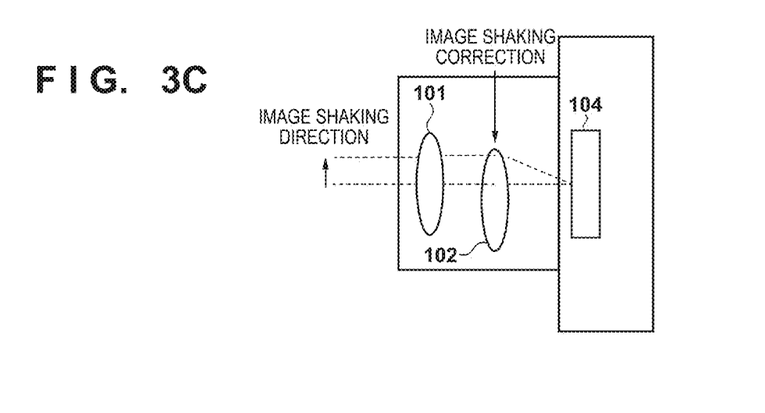

FIGS. 3A to 3C are conceptual diagrams showing an operation of the first correction lens 101 and the second correction lens 102 during an image stabilization operation, and show attitudes of the first correction lens 101, the second correction lens 102, and the image sensor 104. During an image stabilization operation, control is performed such that image blurring is minimized by effectively applying correction lenses with different ways of moving in accordance with whether the zoom lens included in the optical system unit 100 is on a telephoto side or on a wide-angle side.

FIG. 3A shows a state in which there is no image blurring, and the lens centers of the first correction lens 101 and the second correction lens 102 are located on the optical axis.

Next, a state during an image stabilization operation will be described. If the zoom lens is located on the wide-angle side, image blurring is mainly caused by shifting of the camera. Thus, the second correction lens 102 is controlled such that image shifting with respect to the optical axis that occurs due to shifting of the camera as shown in FIG. 3C is counteracted, whereby the image blurring is corrected.

On the other hand, in the case where the zoom lens is located on the telephoto side, image blurring is mainly caused by camera tilting. Therefore, as shown in FIG. 3B, the first correction lens 101 is controlled such that image shifting with respect to the optical axis that occurs due to camera tilting is counteracted, whereby the image blurring is corrected.

It is possible to perform image stabilization by driving the first correction lens 101 and the second correction lens 102 in this way. Note that in the examples shown in FIGS. 3A to 3C, a case was described in which only one of the first correction lens 101 and the second correction lens 102 was controlled, but it is possible to control the first correction lens 101 and the second correction lens 102 in combination with each other.

Next, a range in which refocusing is possible in the case of generating a refocus image using signals obtained from the image sensor 104 having the configuration shown in FIG. 2A will be described.

In pixel unit cells included in the image sensor 104, a two-dimensional image constituted by only signals from PDs existing at the same location with respect to each microlens has parallax with respect to a two-dimensional image constituted by only signals from PDs existing at another location that is the same with respect to each microlens. For example, an image constituted by only signals from PD 1A in FIG. 2A and an image constituted by only signals from PD 2A are different with respect to parallax. That is to say, it is possible to obtain a total of 36 different parallax images from the image sensor 104, which is constituted by 6×6 PDs.

Generally, with a light-field camera, pixels with different parallax corresponding to the number of divided pixels are composited to obtain a refocus image. As a principle for obtaining a refocus image, in the example of the image in FIG. 2B, in the case of compositing such that there is no parallax at the position of the flower, an image that is in focus at the position of the flower and blurred due to adding together and compositing images with parallax at the position of the leaves is obtained. Moreover, in the case of compositing such that there is no parallax at the position of the leaves, an image that is in focus at the position of leaves and blurred at the position of the flower is obtained.

At this time, the range in which refocusing is possible is only the in-focus range of the parallax images. This is due to the fact that even if addition is performed so that there is no parallax in the blurred parallax images, the original image is not sharp, and therefore only a blurred image can be obtained. In other words, the range in which refocusing is possible is determined based on the depth of focus of the parallax images constituted by signals from the PDs at each position.

Figure 4:
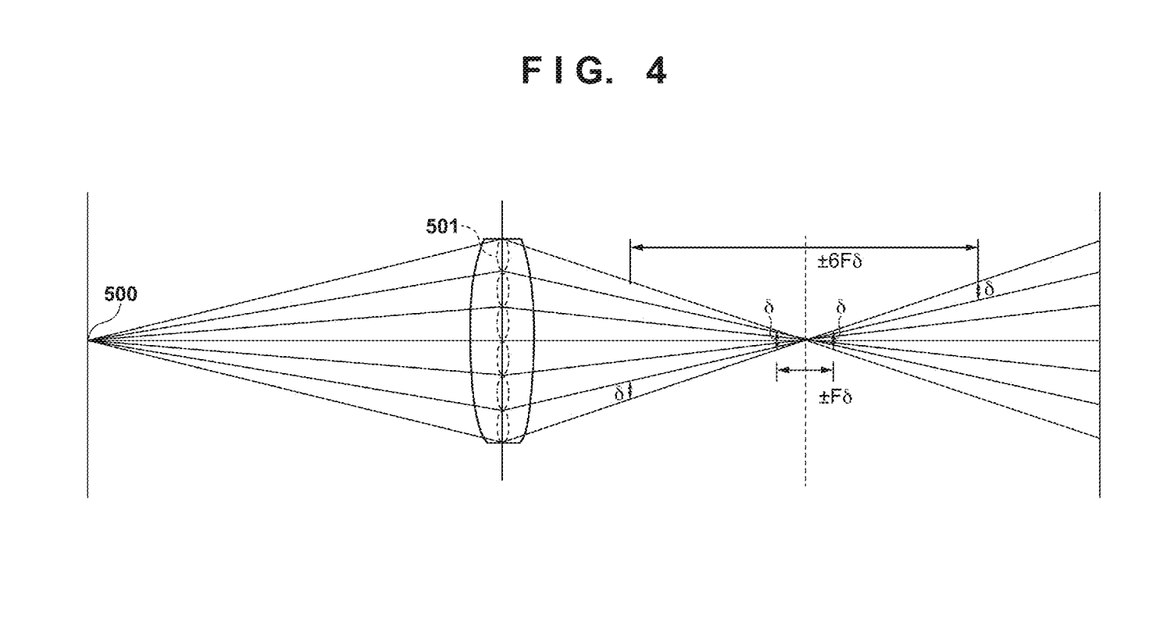
FIG. 4 is a diagram illustrating a range in which refocusing is possible in the case of dividing each pixel unit cell into 6×6 sections.

The range in which refocusing is possible will be described in detail with reference to FIG. 4. In FIG. 4, letting δ be the acceptable circle of confusion, and letting F be the aperture value of the diaphragm 103, the depth of field at aperture value F is ±Fδ. In contrast to this, the effective aperture value F01 in the horizontal and vertical direction of a pupil portion region 501 that is smaller due to being divided into 6×6 portions as shown in FIG. 2A becomes darker such that F01=6F (6 is the number of divisions) is satisfied. As a result, the effective depths of field of the parallax images become six times deeper such that ±6Fδ is satisfied, and the in-focus ranges thereof become six times wider. In other words, for each parallax image, an in-focus subject image can be obtained in a range of ±6Fδ for the effective depth of field. A refocus image in a light field is an image obtained by compositing pixels, and therefore it is necessary that the images constituted by the pixels are at least in focus. Thus, with refocus processing after shooting, the defocus amount d can be virtually moved in the range expressed by equation (1).

$$|d| \leq 6F\delta \quad (1)$$

Note that the acceptable circle of confusion δ is defined by the inverse of the Nyquist frequency ½ΔX (ΔX being the pixel period), or in other words, δ=2ΔX, or the like. Thus, the depths of focus of the parallax images are determined according to the number of divided pixels that share an exit pupil.

Figure 5A:
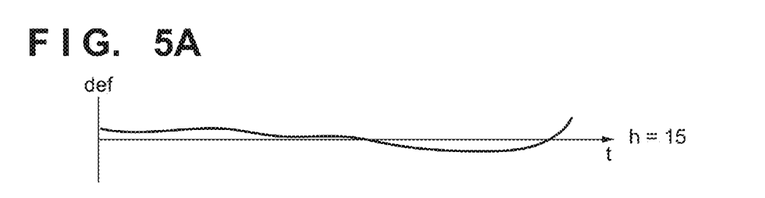
FIGS. 5A to 5C are diagrams showing defocus amounts that occur due to driving the first correction lens and the second correction lens.
Figure 5B:
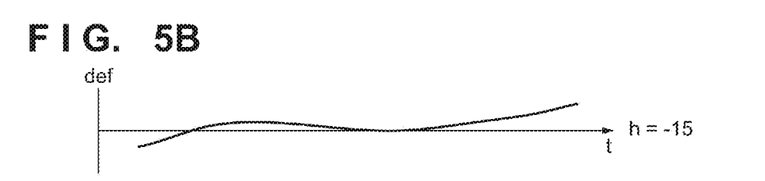
Figure 5C:
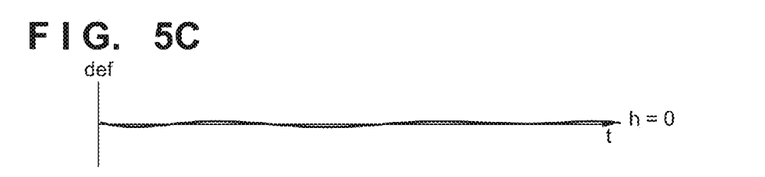

Next, image blurring that occurs due to driving of the first correction lens 101 and the second correction lens 102 will be explained with reference to FIGS. 5A to 5C. FIGS. 5A to 5C are diagrams showing examples of defocus amounts at different image heights obtained while driving the first correction lens 101 and the second correction lens 102 at a certain focus distance, the image height being indicated as h, and the defocus amount being indicated as def. FIGS. 5A to 5C show defocus amounts def in the case where the image heights h are 15, −15, and 0.

Due to the first correction lens 101 and the second correction lens 102 being driven in this way, the focus planes are different for each image height in the image sensor 104, and a state exists in which so-called uneven blurring appears, where the image is in focus at the image height center but is not in focus at other image heights.

Figure 6:
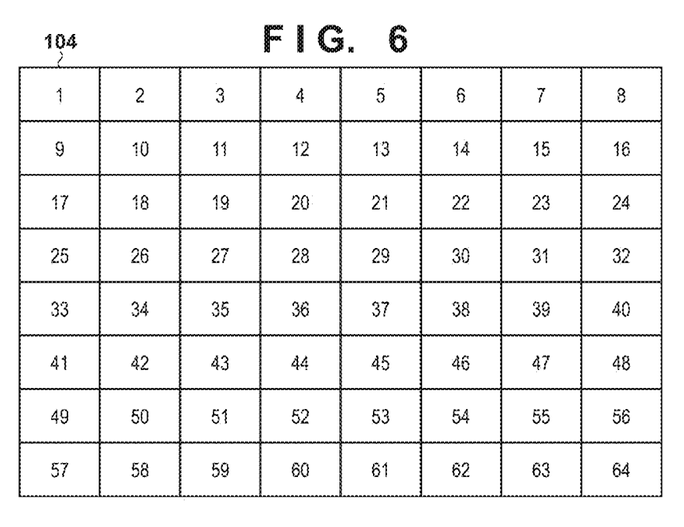
FIG. 6 is a diagram showing an example of a block division method according to the first embodiment.

In view of this, in the first embodiment, when an image is focused at a predetermined image height as a reference image height (for example, the center of the image height), the defocus amounts at different image heights are stored in the ROM 114 for different driving states of the first correction lens 101 and the second correction lens 102. More specifically, as shown in FIG. 6, the defocus amount is stored for each block of the image sensor 104 divided into 64 (8×8) blocks with respect to different image heights. The defocus amounts can be obtained, when shipping from a factory, by shooting a reference image placed at a predetermined distance while driving the image stabilization optical system to different states by using an image sensor that is capable of detecting a focus state.

At this time, as the defocus amount for each of the 64 divided blocks, for example, an average of the defocus amounts of pixels included in each block, or the defocus amount of a pixel located at the center of each block is stored. Note that in the first embodiment, the defocus amounts for the 64 divided blocks are stored, however, the present invention is not limited to this and, for example, an approximate equation for obtaining the defocus amounts or the defocus amounts for the different number of blocks may be stored. In other words, information for obtaining the defocus amount for each image height with respect to different states of an optical system needs to be stored.

The refocus unit 107 corrects uneven blurring by performing refocusing based on the position of the image stabilization optical system, and outputs an image signal to the digital signal processing unit 108. More specifically, the refocus unit 107 generates an image by shifting a virtual focus plane for each image height by the defocus amount stored in the ROM 114 obtained through the CPU 110.

At this time, in order to shift the virtual focus plane by the set defocus amount, the image signals obtained from PDs 1A to 6F in each pixel unit cell in FIG. 2A are relatively shifted on the basis of the conversion coefficient K, and the results are added. As described above, the conversion coefficient K is for converting an image shift amount to a defocus amount, and the same number of conversion coefficients K as the number of possible combinations for obtaining relative shift amounts with respect to a reference PD exist. In a case where each unit pixel cell is constituted by 6×6=36 PDs, the number of combination for obtaining relative shift amounts with respect to the reference PD, namely, 36−1=35 conversion coefficients K exit. In addition, the conversion coefficients are set on the basis of the f-number and pixel pitch.

In the first embodiment, given that the reference PD is PD 1A, the conversion coefficients K exist for the combination of PD 1A and other 35 PDs indicated by columns 1 to 6 (i) and rows A to F (j) except PD 1A. Hereinafter, the respective conversion coefficients K are noted by K2A to K6F (Kij). Furthermore, let the shift amounts (correction values) of PD2A to 6F be N2A to N6F (Nij), and let the defocus amounts to be moved be dc, the shift amounts of PDs other than PD 1A can be expressed by equation (2).

$$Nij = dc/Kij \quad (2)$$

The signals obtained from PDs are shifted on the basis of the shift amounts N2A to N6F obtained by using the equation (2), and the results are added. Thereby it is possible to virtually move the focus planes.

It should be noted that, as the refocusing is performed independently for each block and an image is formed by putting the processed blocks together, the border between the blocks may appear, since the processing differs between blocks. If the border appears, it is advisable to generate overlapped image portions for a portion of an image near the border between blocks, and take arithmetic means of the overlapped image portions.

Alternatively, instead of compositing the blocks that have undergone the refocusing, a defocus amount to be applied to each pixel may be obtained from the defocus amount of each block and the defocus amount of the adjoining block, and correction by refocusing may be performed using the obtained defocus amount.

Figure 7:
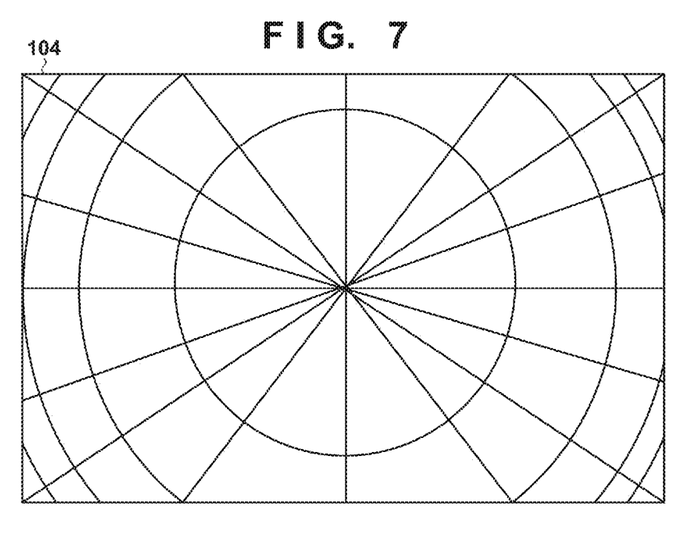
FIG. 7 is a diagram showing another example of a block division method according to the first embodiment.

Further, in the first embodiment, the defocus amount is set for each divided rectangular block, however, the present invention is not limited to this. For example, the defocus amount may be set for each of a plurality of blocks divided by angle and distance with the center of the image height being the center of polar coordinates. FIG. 7 shows an example in which the plane is divided using polar coordinates such that the center portion is sparse and the peripheral portion is dense.

In the above description, a method of relatively shifting signals obtained from PDs on the basis of the conversion coefficients K and adding the results is explained as a refocusing method, however, the present invention is not limited to this. For example, a refocusing method in which processing is performed in a Fourier space as described in U.S. Pat. No. 8,358,367 may be adapted.

Further, a case in which the conversion coefficients K are stored in advance in the ROM 114 is described in the first embodiment, however, the conversion coefficients K may be set in accordance with optical state, pixel pitch, the number of division of PD in each unit pixel cell.

Next, the image stabilization operation according to the first embodiment will be explained with reference to the flowchart shown in FIG. 8. This image stabilization operation is started by a user operating a moving image shooting switch (not shown).

In step S11, the CPU 110 sets non-addition readout of the PDs 1A to 6F in the image sensor driver 111. In step S12, the CPU 110 obtains an image stabilization amount on the basis of the output from the gyrosensor 113, and in step S13, controls driving of the first correction lens 101 and the second correction lens 102 through the lens driver 112, then the process proceeds to step S14.

In step S14, the CPU 110 reads out the defocus amounts def for different image heights stored in the ROM 114, and the process proceeds to step S15. In step S15, the CPU 110 determines whether or not the stored defocus amounts for different image heights are within a range, expressed by the equation (1), in which refocusing is possible, and if yes, the process proceeds to step S17, whereas if no, the process proceeds to step S16. In step S16, the CPU 110 limits the defocus amounts def to the upper limit of the range in which the refocusing is possible, and the process proceeds to step S17.

In step S17, the image sensor 104 performs photoelectric conversion on an optical image entered through the optical system unit 100, and outputs the resultant image signal to the refocus unit 107 via the A/D conversion unit 105 and the capture unit 106, then the process proceeds to step S18. In step S18, the refocus unit 107 performs refocusing based on the set defocus amounts for different image heights and corrects uneven blurring, and the process proceeds to step S19.

In step S19, the CPU 110 determines whether or not to end the moving image shooting based on the state of the moving image shooting switch. If the moving image shooting is to be continued, the process proceeds to step S12, whereas if the moving image shooting is to be ended, the operation of FIG. 8 is ended.

According to the first embodiment as described above, by performing refocusing, it is possible to properly correct uneven blurring occurred due to driving of the image stabilization optical system.

It should be noted that the first embodiment has described the apparatus which has both the first correction lens 101 and the second correction lens 102, however, the present invention is not limited to this. The present invention can be applied to an image capturing apparatus in which the defocus amounts differ between a center portion and a peripheral portion of an image sensor.

Note that in the above-described example, a description was given in which an image stabilization operation is performed in the case of shooting a moving image, but it is also possible to execute an image stabilization operation at a time of performing a so-called live view when shooting a still image.

Also, in the first embodiment, description was given under the assumption that the optical system unit 100 is included in the image capturing apparatus 1, but the optical system unit 100 may be detachable therefrom.

Also, the first embodiment described a configuration in which shaking of the image capturing apparatus 1 is detected by the gyrosensor 113, but the method for detecting shaking is not limited thereto, and it is possible to use a known method. For example, it is possible to use a configuration in which shaking of the image capturing apparatus 1 is detected by detecting the movement of an image between successive frames, and it is possible to use a configuration in which detection is performed using the gyrosensor 113 in combination therewith.

<Modification>

The above-described first embodiment described a case in which charges were read out independently from 6×6 PDs by means of non-addition readout from the pixel unit cells of the image sensor 104. If the image sensor has 6×6 PDs, the charges are read out independently from the 6×6 PDs, whereby it is possible to obtain the largest range in which correction by means of refocusing is possible. However, since the amount of processing also increases proportionately, a problem occurs with regard to power consumption.

In view of this, in this modification, in order to achieve a decrease in power consumption while securing the maximum amount of image stabilization of the first correction lens 101, the PD readout method is switched. Note that the configuration of the image capturing apparatus according to the modification is similar to that described with reference to FIGS. 1 and 2A to 2C in the first embodiment, and therefore description thereof will not be included here.

Figure 9A:
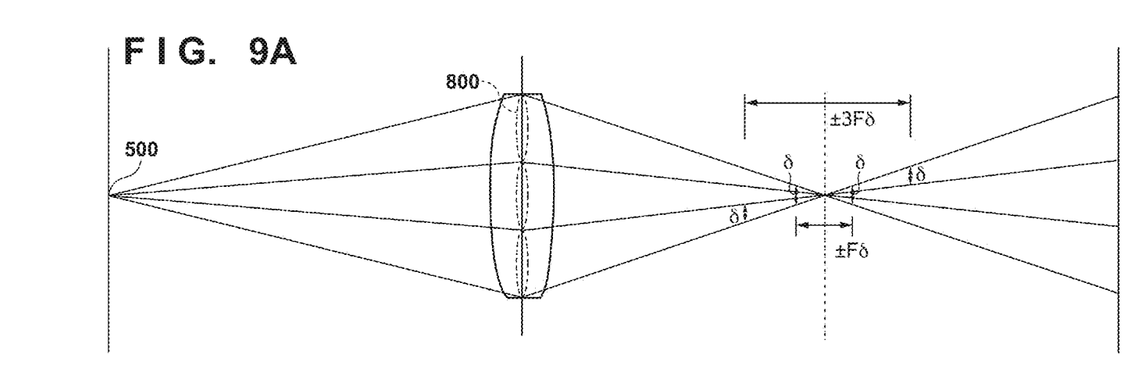
FIGS. 9A and 9B are diagrams illustrating ranges in which refocusing is possible in cases where each pixel unit cell is divided into 3×3 blocks and 2×2 blocks.

The range in which refocusing is possible at the time of changing the readout method in the modification will be described with reference to FIGS. 9A and 9B. FIG. 9A shows a case of reading out 6×6 PDs by adding them together in units of 2×2 PDs. In this case, reference numeral 800 indicates a pupil portion region, the defocus amount d can be expressed by equation (3), and the focus plane can be moved virtually within the range of the defocus amount d.

$$|d| \leq 3F\delta \quad (3)$$

Figure 9B:
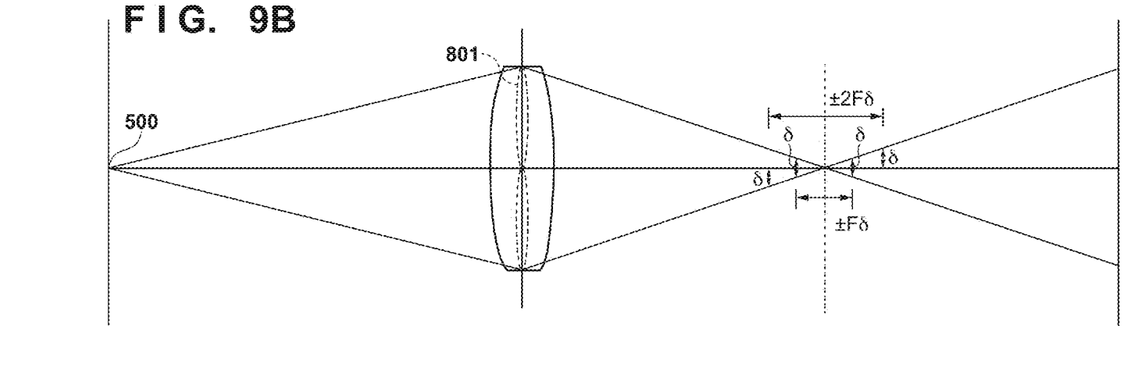

FIG. 9B shows a case of reading out 6×6 PDs by adding them together in units of 3×3 PDs. In this case, reference numeral 801 indicates a pupil portion region, the defocus amount d can be expressed by equation (4), and the focus plane can be moved virtually within the range of the defocus amount d.

$$|d| 2F\delta \quad (4)$$

Figure 8:
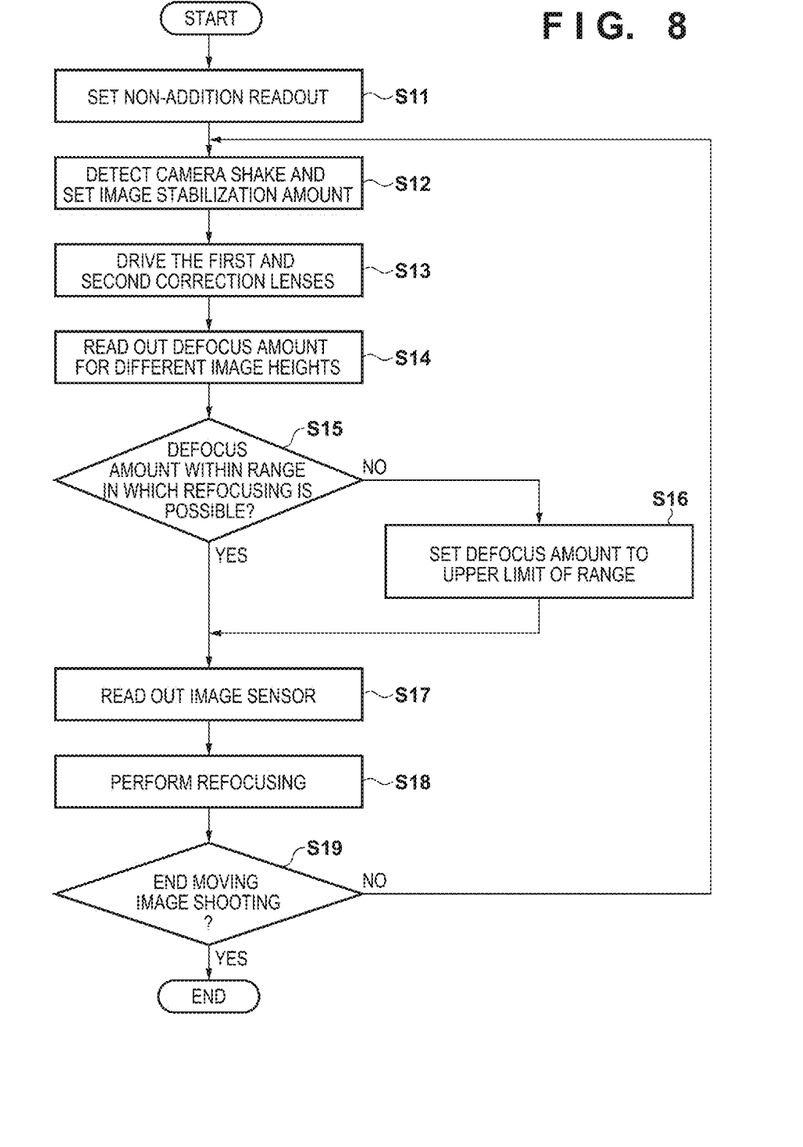
FIG. 8 is a flowchart of uneven blurring correction processing according to the first embodiment.

In this case, by deciding a divisional readout method in step S11 in FIG. 8, and determining whether or not the defocus amounts are within the range of the defocus amount d prescribed by the equation (3) or (4) in step S15, it is possible to achieve the same effects as those of the first embodiment.

Second Embodiment

Next, a second embodiment of the present invention will be explained. In the first embodiment described above, a method of correcting uneven blurring, generated due to the state of the image stabilization optical system at the time of image shooting, by the image capturing apparatus 1 is explained. By contrast, explained in the second embodiment is an image processing method of correcting uneven blurring occurred in shot data using a computer program.

Figure 10:
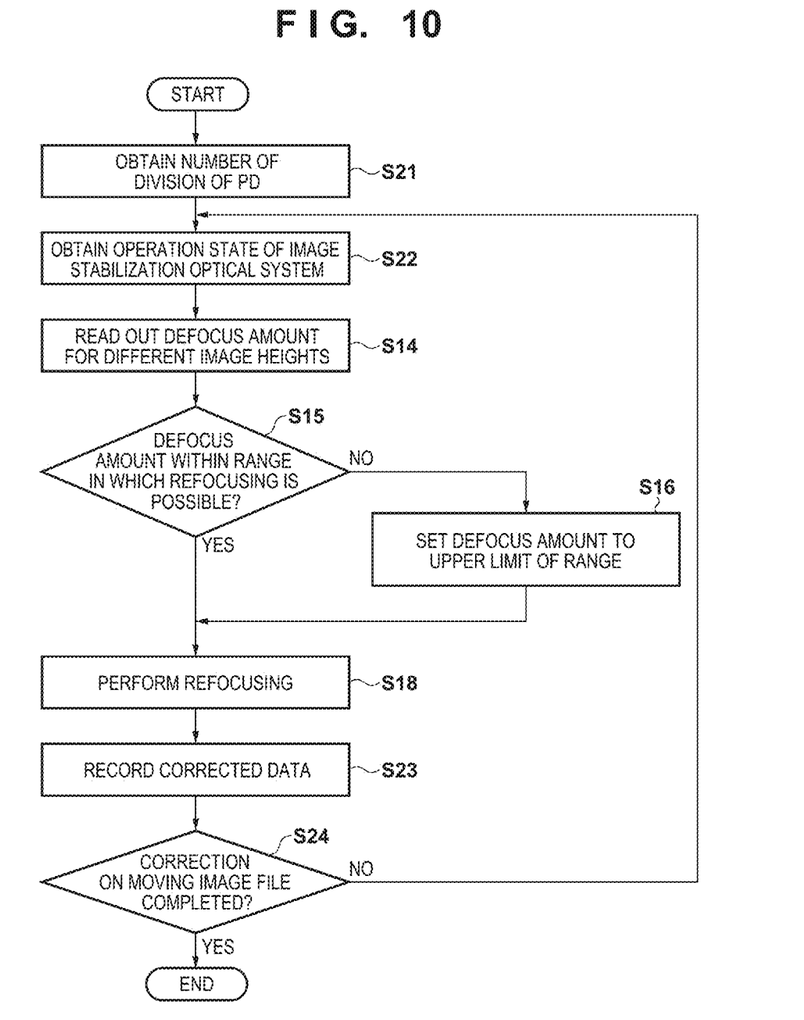
FIG. 10 is a flowchart of uneven blurring correction processing according to a second embodiment.

FIG. 10 is a flowchart explaining image processing in which a computer program performs correction. It should be noted that, in steps S14, S15, S16 and S18 in FIG. 10, processes same as those performed in the same numbered steps in FIG. 8 by the CPU 110 of the image capturing apparatus 1 are performed, accordingly, the explanation of them are omitted here. This image stabilization processing is started by reading out light field (LF) data from a recording device, typified by a hard disk, in response to a user operation.

In step S21, the number of division of PD and information on an optical system unit at a time of obtaining the recorded LF data are obtained from a header portion of the LF data, and in step S22, operation state of the image stabilization optical system at the time of obtaining the recorded LF data is obtained, then the process proceeds to step S14. In step S14, defocus amounts def for different image heights are read out from a look-up table that is prepared in advance in accordance with the operation state of the image stabilization optical system and the information on the optical system unit, and the process proceeds to step S15.

In steps S15, S16 and S18, the same processes as those described in the first embodiment are performed, and the process proceeds to step S23. In step S23, corrected data is recorded in the recording device, and the process proceeds to step S24. In step S24, whether or not a moving image file has been corrected to the last data is checked, and if the last data is corrected, the operation of this flowchart is ended, otherwise, the process proceeds to step S21.

According to the second embodiment as described above, it is possible to realize the processes explained in the first embodiment by a computer program, and correct uneven blurring in the recorded LF data caused by driving of the image stabilization optical system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-042976, filed on Mar. 4, 2015 which is hereby incorporated by reference herein in its entirety.

What is claimed is:

1. An image processing apparatus that corrects an image using an image signal obtained by performing shooting by an image sensor which includes a plurality of photoelectric conversion portions that correspond to each of a plurality of microlenses and is configured to perform photoelectric conversion on a light flux that enters via an imaging optical system including an image stabilization optical system configured to correct a camera shake, comprising:
    a first obtaining unit that obtains the image signal and a driving state of the image stabilization optical system at a time of image shooting;
    a second obtaining unit that obtains correction values for correcting variation in defocus amounts due to shift of a focus plane at different image heights in the image sensor that occurred due to driving of the image stabilization optical system; and
    a refocus unit that performs refocusing on the basis of the obtained image signal and generates the image,
    wherein the refocus unit corrects the variation in defocus amounts by refocusing on the basis of the correction values.

2. The image processing apparatus according to claim 1, wherein information of defocus amounts at different image height of the image sensor with respective to a plurality of driving states of the image stabilization optical system is stored in a storage unit, and
    the second obtaining unit obtains the correction values on the basis of the defocus amounts read out from the storage unit.

3. The image processing apparatus according to claim 2, wherein the information of the defocus amounts is defocus amounts of images at different image heights, wherein the images are obtained by shooting a reference image in a plurality of driving states of the image stabilization optical system.

4. The image processing apparatus according to claim 2, wherein the information of the defocus amounts is an approximate equation for obtaining defocus amounts at different image height in a plurality of driving states of the image stabilization optical system.

5. The image processing apparatus according to claim 2, wherein the information of the defocus amount is provided for each of a plurality of blocks obtained by dividing the image sensor into rectangles.

6. The image processing apparatus according to claim 2, wherein the information of the defocus amount is provided for each of a plurality of blocks obtained by dividing the image sensor by angle and distance with a center of image height as a center position of polar coordinates.

7. The image processing apparatus according to claim 1, wherein the second obtaining unit converts the variation in the defocus amounts to shift amounts for shifting a signal read out from the plurality of photoelectric conversion portions in order to correct the variation by the refocusing, and sets the shift amounts as the correction values.

8. The image processing apparatus according to claim 7, wherein the second obtaining unit obtains, for the plurality of photoelectric conversion portions except for a reference photoelectric conversion portion, that is predetermined one of the plurality of photoelectric conversion portions, conversion coefficients for converting shift amounts of the signal read out from the plurality of photoelectric conversion portions except for the reference photoelectric conversion portion to the defocus amounts by the refocusing, and divides the defocus amounts by the conversion coefficients to obtain the shift amounts of the signal obtained from the plurality of photoelectric conversion portions except for the reference photoelectric conversion portion.

9. The image processing apparatus according to claim 1, wherein the second obtaining unit changes, in a case where the defocus amounts are beyond a range in which refocusing is possible by the refocus unit, the defocus amounts to the upper limit of the range in which the refocusing is possible.

10. The image processing apparatus according to claim 1, wherein the defocus amounts are defocus amounts at the different image heights with the center of the image height of the image sensor being focused.

11. An image capturing apparatus comprising:
an image sensor; and
an image processing apparatus that corrects an image using an image signal obtained by performing shooting by an image sensor which includes a plurality of photoelectric conversion portions that correspond to each of a plurality of microlenses and is configured to perform photoelectric conversion on a light flux that enters via an imaging optical system including an image stabilization optical system configured to correct a camera shake, comprising:
a first obtaining unit that obtains the image signal and a driving state of the image stabilization optical system at a time of image shooting;
a second obtaining unit that obtains correction values for correcting variation in defocus amounts due to shift of a focus plane at different image heights in the image sensor that occurred due to driving of the image stabilization optical system; and
a refocus unit that performs refocusing on the basis of the obtained image signal and generates the image,
wherein the refocus unit corrects the variation in defocus amounts by refocusing on the basis of the correction values.

12. An image processing method of correcting an image using an image signal obtained by performing shooting by an image sensor which includes a plurality of photoelectric conversion portions that correspond to each of a plurality of microlenses and is configured to perform photoelectric conversion on a light flux that enters via an imaging optical system including an image stabilization optical system configured to correct a camera shake, the method comprising:
obtaining the image signal and a driving state of the image stabilization optical system at a time of image shooting;
obtaining correction values for correcting variation in defocus amounts due to shift of a focus plane at different image heights in the image sensor that occurred due to driving of the image stabilization optical system; and
performing refocusing on the basis of the obtained image signal and generates the image,
wherein the variation in defocus amounts is corrected by the refocusing on the basis of the correction values.

13. A non-transitory readable storage medium having stored thereon a program which is executable by a computer, the program having a program code for causing the computer to function as each unit of an image processing apparatus that corrects an image using an image signal obtained by performing shooting by an image sensor which includes a plurality of photoelectric conversion portions that correspond to each of a plurality of microlenses and is configured to perform photoelectric conversion on a light flux that enters via an imaging optical system including an image stabilization optical system configured to correct a camera shake, the apparatus comprising:
a first obtaining unit that obtains the image signal and a driving state of the image stabilization optical system at a time of image shooting;
a second obtaining unit that obtains correction values for correcting variation in defocus amounts due to shift of a focus plane at different image heights in the image sensor that occurred due to driving of the image stabilization optical system; and
a refocus unit that performs refocusing on the basis of the obtained image signal and generates the image,
wherein the refocus unit corrects the variation in defocus amounts by refocusing on the basis of the correction values.

* * * * *